(12) United States Patent
Lee et al.

(10) Patent No.: US 7,434,267 B2
(45) Date of Patent: Oct. 7, 2008

(54) METHOD OF PREVENTING REDUCTION OF SALES AMOUNT OF RECORDS DUE TO A DIGITAL MUSIC FILE ILLEGALLY DISTRIBUTED THROUGH COMMUNICATION NETWORK

(75) Inventors: Cheol-Woong Lee, Seoul (KR); Chang-Young Lee, Seoul (KR)

(73) Assignee: Loudeye Corp., Seattle, WA (US)

( * ) Notice: Subject to any disclaimer, the term of this patent is extended or adjusted under 35 U.S.C. 154(b) by 645 days.

(21) Appl. No.: 09/977,896

(22) Filed: Oct. 15, 2001

(65) Prior Publication Data

US 2003/0078889 A1 Apr. 24, 2003

(30) Foreign Application Priority Data

Feb. 2, 2001 (KR) .................. 2001-5038

(51) Int. Cl.
*G06F 7/04* (2006.01)
(52) U.S. Cl. .................................................... 726/32
(58) Field of Classification Search ............... 713/193; 726/26–33
See application file for complete search history.

(56) References Cited

U.S. PATENT DOCUMENTS

| 5,613,004 | A  | * | 3/1997  | Cooperman et al. ........... 380/28 |
| 6,366,907 | B1 | * | 4/2002  | Fanning et al. ................. 707/3 |
| 6,445,822 | B1 | * | 9/2002  | Crill et al. .................... 382/218 |
| 6,499,105 | B1 | * | 12/2002 | Yoshiura et al. ............. 713/176 |
| 6,732,180 | B1 | * | 5/2004  | Hale et al. ................... 709/229 |

OTHER PUBLICATIONS

Gutberlet, L., "Peer-to-Peer Computing—A Technology Fad or Fact ?—", Oct. 10, 2000, obtained from http://wwwfl.ebs.de/lehrstuehle/wirtschaftsinformatik/Lehre/Seminar00/p_gutberlet.pdf, pp. 1-16.*
Schneier, B., "Applied Cryptography", 1996, vol. 2, pp. 4-5.*
Gutberlet, L., "Peer-to-Peer Computing—A Technology Fad or Fact?", Oct. 10, 2000, pp. 1-16.*

(Continued)

*Primary Examiner*—Emmanuel L Moise
*Assistant Examiner*—Jeffrey D Popham
(74) *Attorney, Agent, or Firm*—Alston & Bird LLP

(57) ABSTRACT

A method of preventing reduction of sales amount of records due to a digital music file illegally distributed through a communication network is disclosed. The method comprises a) collecting an illegally produced digital music file, which is derived from a record of a cooperating record corporation by searching the network, b) encrypting the collected digital music file with a predetermined key; and c) redistributing the encrypted digital music file through the network. According to present invention, the method collects the illegally produced (or reproduced) digital music file that is shared and distributed through the network, encrypts the collected music file, and enables only users having a private key to use the digital music files, thus inducing the users habitually using the digital music files to use them after paying a justifiable fee and being assigned the encryption key, and to purchase the formal record.

7 Claims, 6 Drawing Sheets

OTHER PUBLICATIONS

Schneier, B., "Applied Cryptography", 1996, vol. 2, pp. 4-5.*

"Duplicate file manager", Oct. 9, 1999, pp. 1-5, obtained from http://web.archive.org/web/19991009064724/http://www.bigwig.net/silicon/duplic8/.*

Dittmann et al., "Copyright-Copywrong", 2000, pp. 14-17, obtained from IEEE.*

"How To Lay Cuckoo's Eggs", pp. 1-5, Oct. 18, 2000, obtained from http://web.archive.org/web/20001018072441/http://www.hand-2-mouth.com/cuckooegg/resources.htm.*

* cited by examiner

METHOD OF PREVENTING REDUCTION OF SALES AMOUNT OF RECORDS DUE TO A DIGITAL MUSIC FILE ILLEGALLY DISTRIBUTED THROUGH COMMUNICATION NETWORK

BACKGROUND OF THE INVENTION

1. Field of the Invention

The present invention relates in general to a method of preventing reduction of sales amount of records due to a digital music file illegally distributed through a communication network, and more particularly to a method which allows sharing and distributing of a digital music file employing a security technique, such that it can restrain a user from holding and using a digital music file illegally reproduced and thus prevent the reduction of sales amount of records due to the digital music file illegally distributed through a communication network.

2. Description of the Prior Art

Generally, a record corporation cells a record produced by recording an analog or digital signal on a medium such as a cassette tape or an optical disc(e.g. long play disc or compact disc).

As digital audio-concerned techniques have been developed, many software and hardware devices have been developed for forming an analog or digital signal recorded onto a medium as a digital-format music file such that it can be stored or copied easily with a digital device(e.g. personal computer terminal), and freely reproduced from the device.

The digital-format music file generated by the software or hardware devices is easily propagated through a communication network due to its characteristic of simplicity in reproducing and transmitting. Especially, a digital music file with MP3(MPEG1 layer 3) format, which recently has gained great popularity, has a data size smaller than that of a conventional digital music file by 90 to 92%, while its sound quality is as high as an original sound recorded in the medium(for example, compact disc) by using an audio compression technique of MPEG 1. For this reason, a large quantity of digital music files with MP3 format have been illegally reproduced through the communication network.

Moreover, many programs or services such as "Napster" or "Soribada" for sharing digital music files with data format such as MP3 between different users using a P2P(peer to peer) method have been proposed and popularized among users recently. Thus, a search and reproduction of the digital music file through the communication network are gradually becoming easier and more simplified, and thus the users of the programs or the services are progressively increased in number.

Consequently, the conventional digital music file is disadvantageous in that reproduction of the digital music file infringes illegally a copyright of the music and causes sales amount of records to be reduced.

SUMMARY OF THE INVENTION

Therefore, the present invention has been made in view of the above problem, and it is an object of the present invention to provide a method of preventing reduction of sales amount of records due to digital music files illegally distributed through communication network, which collects digital music files shared or distributed through the shared server or program, applies a security technique for restraining users from using the digital music files without permission, and shares or redistributes the digital music file with security through the network, thus preventing users from sharing and using the music files reproduced illegally.

In accordance with one aspect of the present invention, the above and other objects can be accomplished by the provision of a method of a)collecting an illegally produced digital music file, which is derived from a record of a cooperating record corporation, by searching the network, b)encrypting the collected digital music file with a predetermined key; and c)redistributing the encrypted digital music file through the network.

In accordance with another aspect of the present invention, there is provided a method of a)collecting an illegally produced digital music file, which is derived from a record of a cooperating record corporation, by searching the network, b)inserting a watermark containing a predetermined secret information in the collected digital music file, and c)redistributing the watermarked digital music file through the network.

BRIEF DESCRIPTION OF THE DRAWINGS

The above and other objects, features and advantages of the present invention will be more clearly understood from the following detailed description taken in conjunction with the accompanying drawings, in which:

FIG. 3 and FIG. 4 are views of examples showing a search for an illegally produced digital music file using a well-known music file sharing program;

DETAILED DESCRIPTION OF THE PREFERRED EMBODIMENTS

Figure 1:
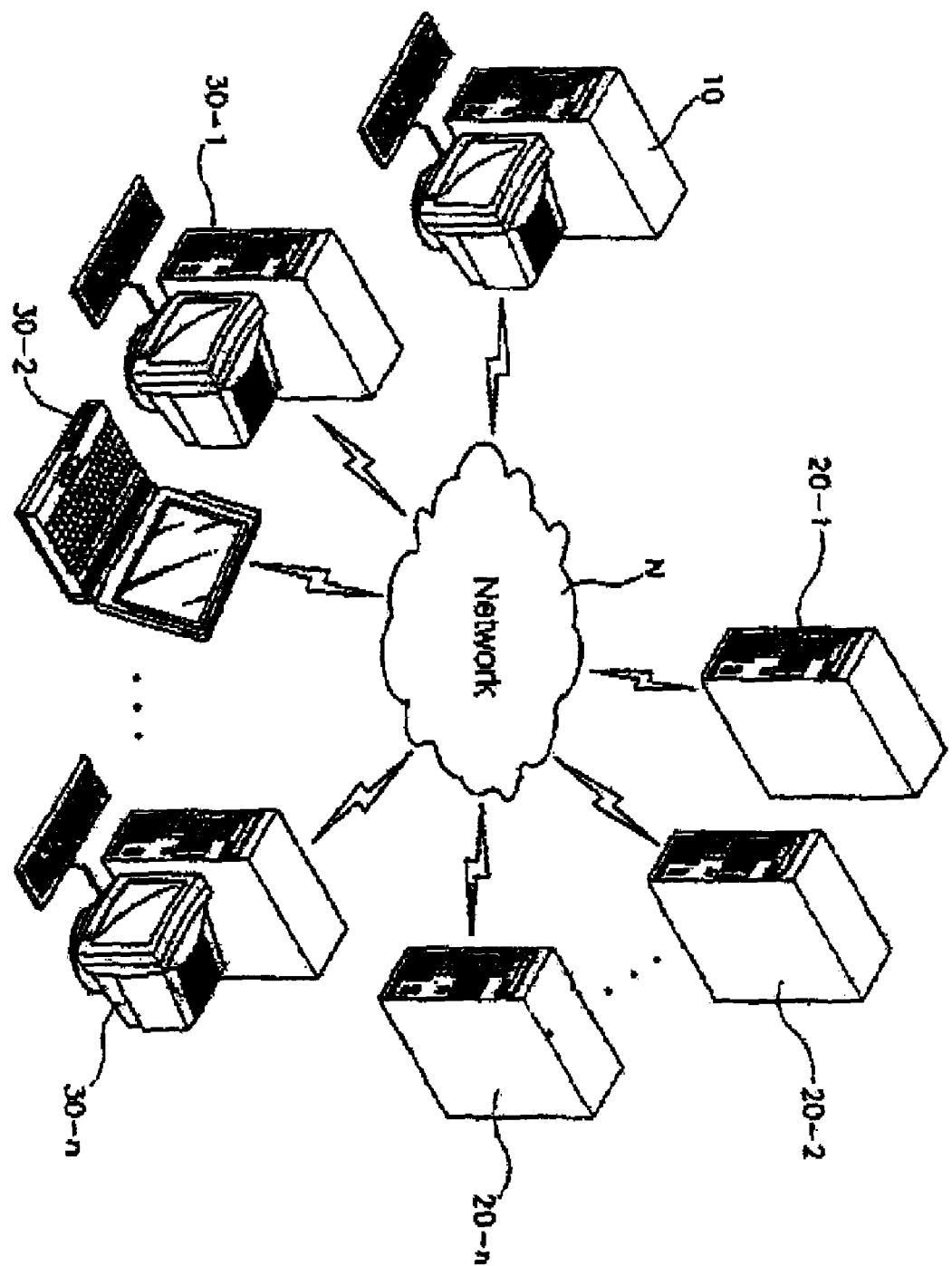
FIG. 1 is block diagram showing a system for performing a method of preventing reduction of sales amount of records due to a digital music file illegally distributed through a communication network.

FIG. 1 is a block diagram showing a system for performing a method of preventing reduction of sales amount of records due to a digital music file illegally distributed through the communication network. Referring to FIG. 1, the system comprises a searching and editing terminal 10, music file sharing servers 20-1~20-n, music file user terminals 30-1~30-n, and a network N. The terminals 10, 30-1~30-n and the servers 20-1~20-n are commonly connected to the network N such as an Internet through various well-known devices like a modem or router, and various methods. The construction and operation of the terminals 10, 30-1~30-n and the servers 20-1~20-n is well known in the field and further explanation is thus not deemed necessary.

The searching and editing terminal 10 searches for the illegally produced digital music file, which is shared or distributed through the network, collects the searched music file, applies a security technique to the collected music files, and shares and distributes the secured digital music file through the network N.

The searching and editing terminal 10 includes a general hardware device(not shown) included in a computer system, such as a main processor, a network adapter, a display adapter, a main memory and an auxiliary memory, and an operating system(OS), and a program tool for applying the security technique such as a public key encryption algorithm and watermarking algorithm to the digital music file. The specific construction and operation of the terminal 10 is well known in the field and further explanation is thus not deemed necessary.

Further, a plurality of music file sharing programs generally used on the network N are installed at the searching and editing terminal 10 in order to search for the digital music files shared and distributed through the network N.

The music file sharing servers 20-1~20-n search another user's terminal connected to the network N for a corresponding digital music file according to requests from the music file user terminals 30-1~30-n, and connect the user terminals 30-1~30-n so as to enable the users to share the digital music files with each other.

The music file user servers 30-1~30-n operate to share the digital music files through the network N and exchange them through the user terminals 30-1~30-n. The music file user servers 30-1~30-n include general hardware devices(not shown) installed in a computer system, such as a main processor, a network adapter, a display adapter, a main memory and an auxiliary memory, and an operating system(OS), and at least one of music file sharing programs for sharing the music files between users through the network N.

Hereinafter, an operation sample of the present invention having the construction above will be described in detail referring to the accompanying drawings.

Figure 2:
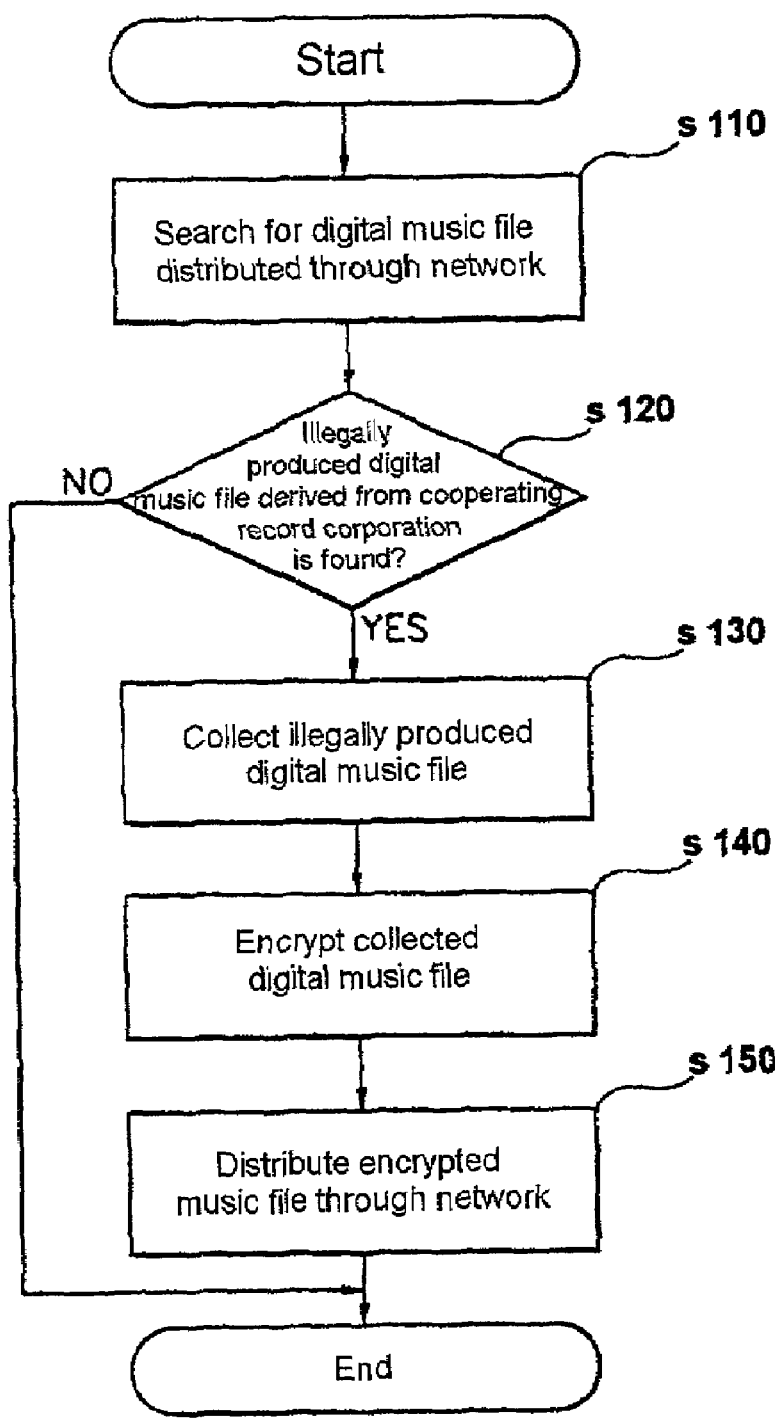
FIG. 2 is a flowchart showing a method of preventing reduction of sales amount of records due to a digital music file illegally distributed through a network.

FIG. 2 is a flowchart showing a method of preventing reduction of sales amount of records due to a digital music file illegally distributed through a communication network of this invention.

Referring to FIG. 2, a plurality of the digital music files distributed on the network N are searched for by the searching and editing terminal 10 connected to the network N at step S110. At this time, the searched digital music file is the music file derived from a record of the cooperating record corporation, and the digital music file can be searched by a generally used file sharing program. Preferably, the sharing program has a relatively high recognition degree among the users and wide popularization, and is used to search for the music file.

Figure 3:
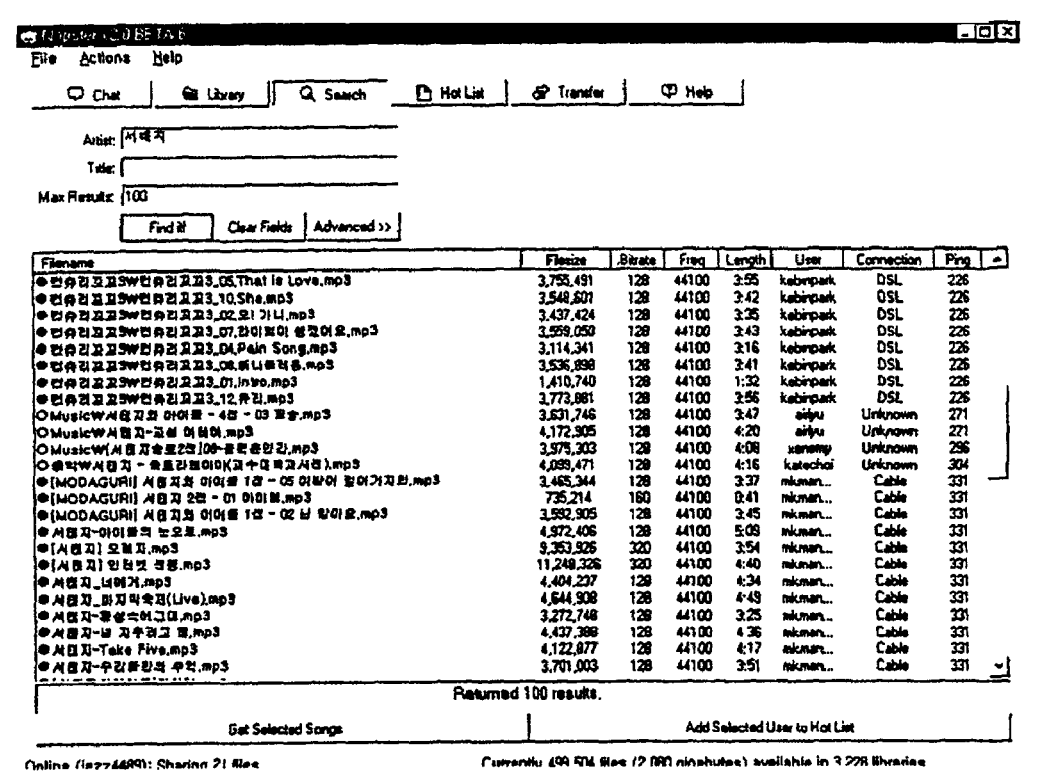
Figure 4:
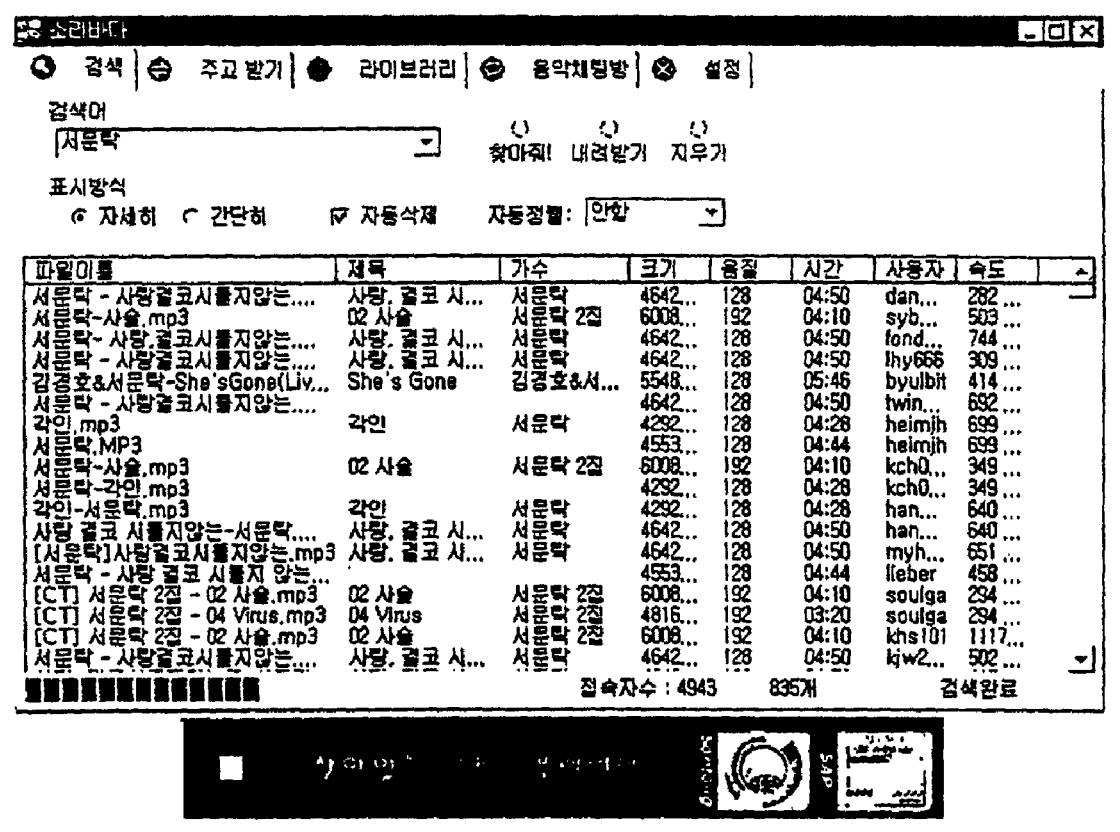

For example, FIG. 3 and FIG. 4 are views displaying searching for the music file shared on the network N by the widely popularized music file programs such as "Napster" or "Soribada".

If the illegally produced music file derived from the record of the cooperating record corporation is found at step S120 according to the searching result at step S110, the found digital music file is collected according to the kinds of music at step S130. Generally, one digital music file per a piece of music is collected. However, if necessary, a plurality of music files per a piece of music can be collected.

According to the kinds of music, if only some part of the music files shared on the network N are collected, it is preferable to collect one among the shared music files in which many copies of the same file have the same name, size and playing time. The greater the numbers of the music file with a same name, size and playing time, the higher probability of its being reproduced later by another user, due to its wide distribution through the network to many users.

Next, the collected digital music file is encrypted according to a well-known encryption algorithm at step S140. Here, it is possible to use any one of a well-known symmetric key encryption algorithms and the public key encryption algorithms, however it is preferable to adopt a public key encryption algorithm, considering a division of the keys.

Generally, a public key encryption algorithm called "Asymmetric key encryption algorithm" is characterized in that it uses different two keys for encryption and decryption. One of the keys is called a private key and the other is called a public key. Typically, the public key is used in encryption and the private key is used in decryption.

Providing that the public key encryption algorithm is adopted to the present invention, the collected digital music file is encrypted with a pubic key authenticated at an authentication organ, such that only the user having a private key can decrypt the digital music file.

The encrypted digital music file is redistributed through the network N at step S150. In this case, the edited digital music file can be distributed using a widely popularized music file sharing program such as "Napster" or "Soribada", thus enabling sharing of the music file with the normal users equally over the network N.

If the digital music file is shared on the network N, the users not having the private key cannot decrypt the digital music file, thereby inducing the user wishing to be assigned the private key to pay a justifiable fee to a corresponding record corporation, or to purchase the formal record.

Figure 5:
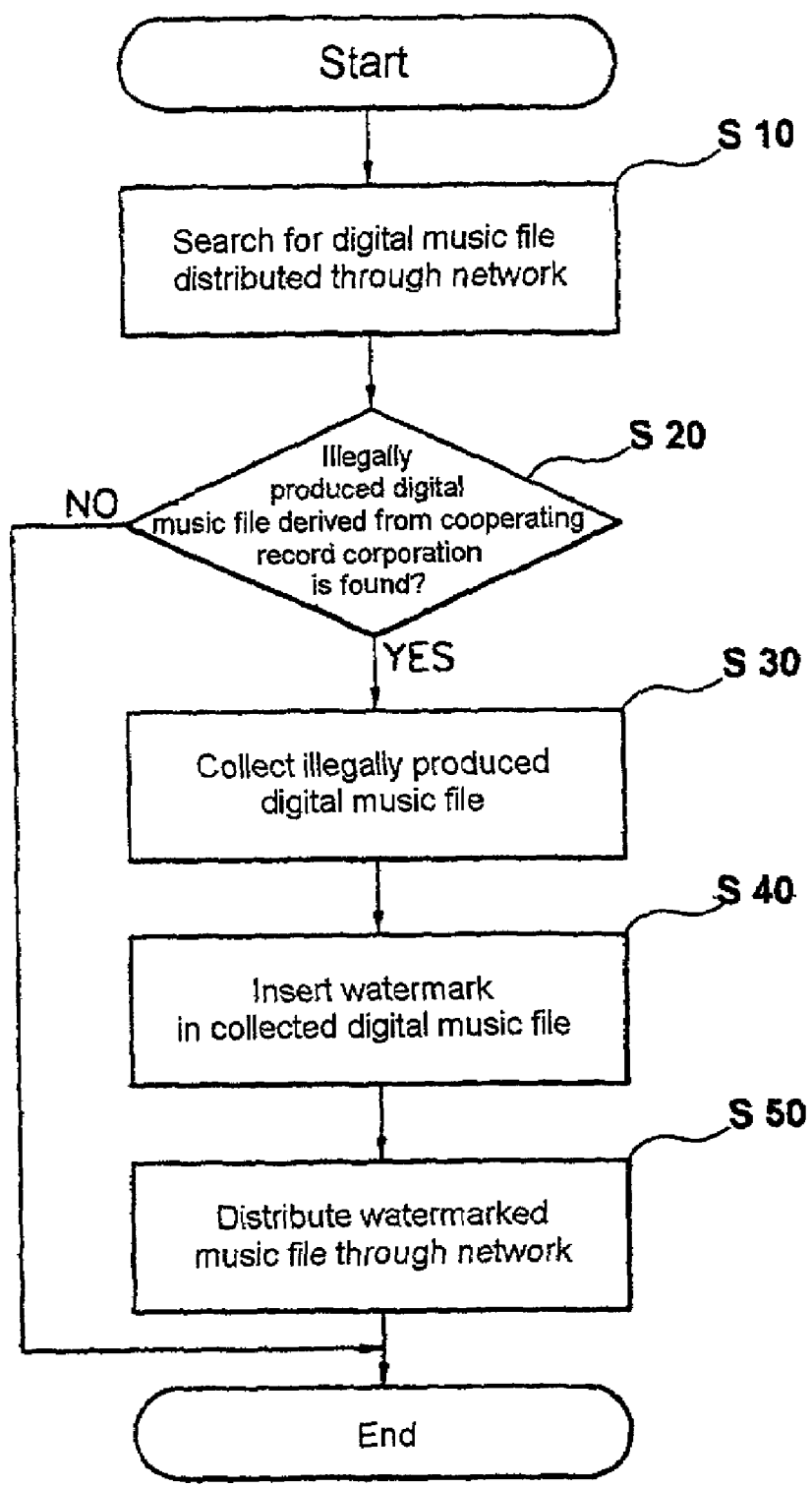
FIG. 5 is a flowchart showing a method according to another preferred embodiment of this invention.

Hereinafter, another preferred embodiment according to the present invention is described in detail referring to FIG. 5. FIG. 5 is a flowchart showing another preferred embodiment of this invention.

First, a plurality of the digital music files distributed on the network N are searched for by the searching and editing terminal 10 connected to the network N at step S10. At this time, the searched digital music file is the music file derived from a record of the cooperating record corporation, and the digital music file can be searched by a generally used file sharing program. Preferably, the file sharing program has a relatively high recognition degree among the users and wide popularization, and is used to search for the music file.

As described above, FIG. 3 and FIG. 4 are views displaying searching for the music file shared on the network N by the widely popularized music file programs such as "Napster" or "Soribada".

If the illegally produced music file derived from the record of the cooperating record corporation is found at step S20 according to the searching result at step S10, the found digital music file is collected according to the kinds of music at step S30. Generally, one digital music file per a piece of music is collected. However, if necessary, a plurality of music files per a piece of music can be collected.

According to the kinds of music, if only some part of the music files shared on the network N are collected, it is preferable to collect one among the shared music files in which many copies of the same file have the same name, size and playing time. The greater the numbers of the music file with a same name, size and playing time, the higher probability of its being reproduced later by another user, due to its wide distribution through the network to many users.

Next, a watermark is inserted in the collected digital music file according to a well-known watermarking algorithm at step S40. In this case, the watermark can include some possession information of a writer or a record corporation, or information of a company executing the watermarking and watermark inserting date information, and etc.

Figure 6A:
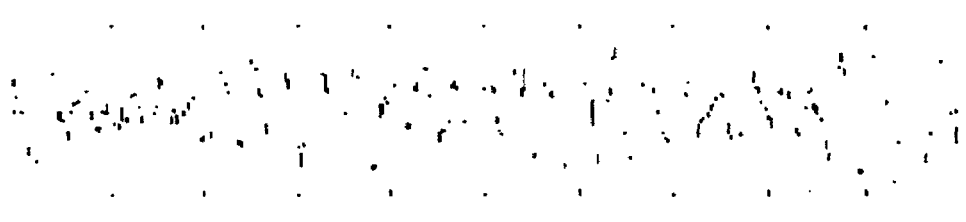
FIGS. 6a and 6b are waveform examples showing an insertion of watermark in the original digital music file.
Figure 6B:
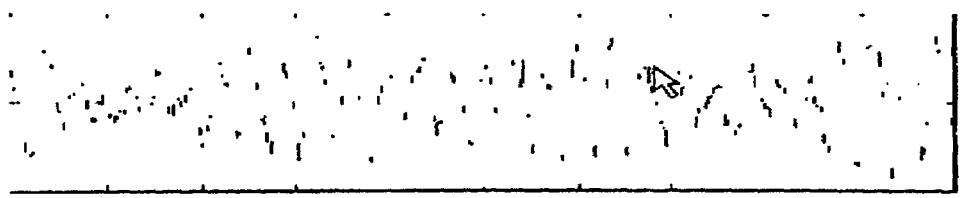

As a reference, FIG. 6a shows a waveform of a predetermined original digital file, and FIG. 6b shows the digital file inserted with the watermark in the original digital file(refer to a position of arrow)

Then, the watermarked digital music file is distributed through the network N at step S50. In order to distribute the watermarked digital music file over the network N, a popular music file sharing program(e.g. "Napster" or "Soribada") is used, thus sharing the music file with the normal users equally.

If the watermarked digital music file is shared on the network N, it is possible to call the users unlawfully using the illegally produced(reproduced) digital music file and a service provider enabling its sharing(e.g. a service provider distributing a service program such as "Napster" or "Soribada" and managing a sharing server) to legal account for illegal reproduction or usage of the music file. If these facts are known to the users, there is an effect of restraining the users from sharing and using the illegal digital music file. Further, through this effect the user listening to the illegally reproduced digital music file is induced to purchase the formal record.

As described above, only the case of sharing and searching the digital music file, which is generated and edited for publicity through the agent server such as "Napster" or "Soribada" is described, but the present invention is not restricted. Further, a program for sharing and searching the digital music file by directly connecting between the users using the P2P without the agent server such as "Gnutella" can be applied to the present invention. It also should be noted that the present invention could be easily applied to a case of downloading a digital music file through a web site.

As apparent from the above description, the present invention provides a method of collecting the illegally produced(or reproduced) digital music file that is shared and distributed through the network, encrypting the collected music file, and enabling only users having a private key to use the digital music files, thus inducing the users habitually using the digital music files to use them after paying a justifiable fee and being assigned the encryption key, and to purchase the formal record.

Further, the present invention inserts the watermark in the illegally produced digital music file collected through the network, thus restraining the users from sharing and using the illegal digital music files.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preventing reduction of sales amount of records due to a digital music file illegally distributed through a communication network, comprising:
   searching a network for an illegally produced digital music file, which is derived from a record of a cooperating record corporation;
   identifying a plurality of digital music files that are substantially the same as the illegally produced digital music file;
   collecting one of the plurality of digital music files that has a greatest number of files having the same name, size and playing time;
   modifying the collected digital music file; and
   redistributing the modified digital music file through the network.

2. The method as set forth in claim 1, wherein searching the network for the illegally produced digital music file comprises searching the network according to a kind of music of the digital music file.

3. The method as set forth in claim 1, wherein the collecting and redistributing are performed by using a popular digital file sharing server.

4. The method as set forth in claim 1, wherein modifying the collected digital music file comprises encrypting the collected digital music file with a predetermined key.

5. The method as set forth in claim 4, wherein encrypting the collected digital music file comprises encrypting with a public key encryption algorithm.

6. The method as set forth in claim 1, wherein modifying the collected digital music file comprises inserting a watermark containing a predetermined secret information in the collected digital music file.

7. The method as set forth in claim 1, wherein modifying the collected digital music file comprises altering original content of the collected digital music file.

* * * * *